United States Patent
Kehrli et al.

(10) Patent No.: US 7,265,521 B2
(45) Date of Patent: *Sep. 4, 2007

(54) REACTIVE POWER COMPENSATION TO MINIMIZE STEP VOLTAGE CHANGES AND TRANSIENTS

(75) Inventors: Arnold P. Kehrli, Middleton, WI (US); John A. Diaz De Leon, II, Madison, WI (US); Douglas C. Folts, Baraboo, WI (US)

(73) Assignee: American Superconductor Corporation, Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/136,333

(22) Filed: May 24, 2005

(65) Prior Publication Data

US 2006/0082348 A1    Apr. 20, 2006

Related U.S. Application Data

(63) Continuation of application No. 09/449,378, filed on Nov. 24, 1999, now Pat. No. 6,900,619.

(51) Int. Cl.
*G05F 1/70* (2006.01)
(52) U.S. Cl. ........................ 323/207; 323/210
(58) Field of Classification Search ................ 323/205, 323/207, 209, 210, 211
See application file for complete search history.

(56) References Cited

U.S. PATENT DOCUMENTS

| | | | |
|---|---|---|---|
| 3,968,422 A | 7/1976 | Waldmann | 323/207 |
| 4,962,354 A | 10/1990 | Visser et al. | 323/360 |
| 5,134,356 A | 7/1992 | El-Sharkawi et al. | 323/211 |
| 5,194,803 A | 3/1993 | Visser et al. | 323/360 |
| 5,376,828 A | 12/1994 | Kim et al. | 307/64 |

(Continued)

FOREIGN PATENT DOCUMENTS

GB    2167582 A    5/1986

OTHER PUBLICATIONS

Banerjee et al., "Application of Magnetic Storage Unit as Continuous VAR Controller", IEEE Transactions on Energy Conversion, IEEE, Inc., NYC, NY, US, vol. 5, No. 1, Mar. 1, 1990, p. 39-44, XP000113036. ISSN: 0885-8969, p. 39, paragraph 0003.

*Primary Examiner*—Jeffrey Sterrett
(74) *Attorney, Agent, or Firm*—Occhiuti Rohlicek & Tsao LLP

(57) ABSTRACT

The invention features a system and approach for minimizing the step voltage change as seen by the utility customer as well minimizing transients imposed on the fundamental waveform of a normal voltage carried on a utility power network when a reactive power source (e.g., capacitor bank) is instantaneously connected to the utility power. The reactive power source is adapted to transfer reactive power of a first polarity (e.g., capacitive reactive power) to the utility power network. The system includes a reactive power compensation device configured to transfer a variable quantity of reactive power of a second, opposite polarity to the utility power network, and a controller which, in response to the need to connect the shunt reactive power source to the utility power network, activates the reactive power compensation device and, substantially simultaneously, causes the shunt reactive power source to be connected to the utility power.

45 Claims, 5 Drawing Sheets

U.S. PATENT DOCUMENTS

| | | |
|---|---|---|
| 5,825,162 A | 10/1998 | Kida et al. .................. 323/210 |
| 5,942,880 A | 8/1999 | Akamatsu et al. .......... 323/207 |
| 6,900,619 B2 * | 5/2005 | Kehrli et al. ............... 323/207 |

* cited by examiner

REACTIVE POWER COMPENSATION TO MINIMIZE STEP VOLTAGE CHANGES AND TRANSIENTS

RELATED APPLICATION

This application is a continuation and claims the benefit of priority under 35 USC 120 of U.S. application Ser. No. 09/449,378, filed Nov. 24, 1999 now U.S. Pat. No. 6,900,619. The disclosure of the prior application is considered part of (and is incorporated by reference in) the disclosure of this application.

INCORPORATION BY REFERENCE

This application herein incorporates by reference the following applications: U.S. application Ser. No. 09/240,751, which was filed on Jan. 29, 1999, U.S. application Ser. No. 60/117,784, filed Jan. 29, 1999, U.S. application Ser. No. 09/449,505, entitled "Discharging a Superconducting Magnet", filed Nov. 24, 1999; U.S. application Ser. No. 09/449,436, entitled "Method and Apparatus for Controlling a Phase Angle", filed Nov. 24, 1999; U.S. application Ser. No. 60/167,377, entitled "Voltage Regulation of a Utility Power Network", filed Nov. 24, 1999; U.S. application Ser. No. 09/449,375, entitled "Method and Apparatus for Providing Power to a Utility Network", filed Nov. 24, 1999; and U.S. application Ser. No. 09/449,435, entitled "Electric Utility System with Superconducting Magnetic Energy Storage", filed Nov. 24, 1999.

BACKGROUND OF THE INVENTION

This invention relates to electric power utility networks including generating systems, transmission systems, and distribution systems serving loads.

Utility power systems, particularly at the transmission level, are primarily inductive, due to the impedance of transmission lines and the presence of numerous transformers. Further, many of the largest loads connected to the utility power system are typically inductive. Large motors used, for example, in lumber mills, rock crushing plants, steel mills, and to drive pumps, shift the power factor of the system away from the desired unity level, thereby decreasing the efficiency of the power system. Because of the daily and hourly load variations, it is necessary to change the amount of compensation applied to counteract the effects of these changing inductive loads One approach for providing compensation to the system is to connect one or more large shunt capacitor banks to provide a capacitive reactance (e.g., as much as 36 MVARs) to the system in the event of a contingency (i.e., a nonscheduled event or interruption of service) or sag in the nominal voltage detected on the utility power system. By selecting the proper amount of capacitance and connection location, these capacitor banks provide a level of control of the line voltage or power factor. Mechanical contactors are typically employed to connect and switch the capacitor banks to compensate for the changing inductive loads.

SUMMARY OF THE INVENTION

The invention features a system and approach for minimizing the step voltage change experienced by the utility customer as well minimizing transients imposed on the fundamental waveform of a normal voltage carried on a utility power network when a reactive power source (e.g., capacitor bank) is instantaneously connected to the utility power. The reactive power source is adapted to transfer reactive power of a first polarity (e.g., capacitive reactive power) to the utility power network.

In one aspect of the invention, the system includes a reactive power compensation device configured to transfer a variable quantity of reactive power of a second, opposite polarity to the utility power network, and a controller which, in response to the need to connect the shunt reactive power source to the utility power network, activates the reactive power compensation device and, substantially simultaneously, causes the shunt reactive power source to be connected to the utility power network.

In another aspect of the invention, a method of providing reactive power compensation from a reactive power source to a utility power network carrying a nominal voltage includes the following steps. A change in magnitude in the desired nominal voltage on the utility power network is detected, and such change results in voltage deviating outside of a utility specified acceptable range. In response to detecting the change in the desired nominal voltage, the reactive power source is connected to the utility power network to provide reactive power compensation of a first polarity. For a predetermined first duration, reactive power compensation of a second opposite polarity is provided to the utility power network in a period substantially coincident with connecting the reactive power source to the utility power network.

By transferring reactive power of a second, opposite polarity to the network when the switch is closed, the magnitude of a potentially large step-like change in reactive power introduced from the reactive power source is offset for a period of time, thereby minimizing potential transients which would normally be imposed over the fundamental utility waveform carried on the utility power network. These transients are caused by the generally step-like change in voltage when the reactive power source is connected to the utility power network. Although there are many forms of transients, which can be imposed on the utility waveform, such transients are typically in the form of oscillatory "ringing" imposed over the fundamental waveform. Such ringing can cause among other problems, false switching of power devices and overvoltage failures. In addition, the sudden step voltage change induced by switching the utility reactive device can disrupt sensitive industrial control systems and processes. An overvoltage failure can be catastrophic to customers. In essence, the system "softens" the sharp, step-like introduction of reactive energy from the reactive power source.

Embodiments of these aspects of the invention may include one or more of the following features.

In a preferred embodiment, the controller is configured to activate the reactive power compensation device to transfer reactive power compensation of the first polarity to the utility power network prior to connecting the shunt reactive power source to the utility power network. As stated above, providing reactive power compensation of the second, opposite polarity to the utility power network opposes the abrupt step like introduction to the utility power network of reactive power of the first polarity delivered by the shunt reactive power source. Providing reactive power compensation of the first polarity prior to connecting the shunt reactive power source to the utility power network, allows a significantly greater magnitude of change in reactance when the reactive power compensation of the second polarity is introduced. Furthermore, the reactive power compensation device provides additional voltage support to the system prior to the shunt reactive power source being connected to the utility power network.

The reactive power compensation of the first polarity is generally provided for a duration between 1 and 2 seconds.

The impedance of a utility power network is primarily inductive, due to the long line lengths and presence of transformers. Thus, in a preferred embodiment, the reactive power source is a capacitor bank and during particular time periods the reactive power compensation device provides inductive power compensation.

The system and method are used with a utility power network that includes a transmission network and a distribution network electrically connected to the transmission network. The distribution network has distribution lines, with the reactive power source normally connected to the transmission network and the reactive power compensation device connected to the distribution network of the utility power network and proximally to each other.

Typically, reactive power compensation is switched on when the nominal voltage drops below 98% and switched off when voltage exceeds 102% of the nominal voltage. Moreover, the allowable step change in the voltage due to switching of the reactive compensation device is typically limited to about 2% at the transmission voltage level In certain applications, after providing reactive power compensation of the second opposite polarity, a second stage of reactive power compensation of the first polarity is provided in conjunction with the reactive power source providing reactive power compensation. In other words, the reactive power compensation device supplements the reactive power provided by the reactive power source.

For example, in an emergency mode operation, the voltage on the utility power network may have dropped significantly. In this case, the inverter will operate continuously to provide reactive power in conjunction with the capacitor bank. If the inverter is only operated for a relatively short, emergency mode, the inverter may be operated in overload fashion to provide a maximum amount of reactance. Alternatively, the inverter can be operated in a steady state mode, to provide a lower reactance level over a longer, indefinite duration.

These and other features and advantages of the invention will be apparent from the following description of a presently preferred embodiment and the claims.

DETAILED DESCRIPTION

Figure 1:
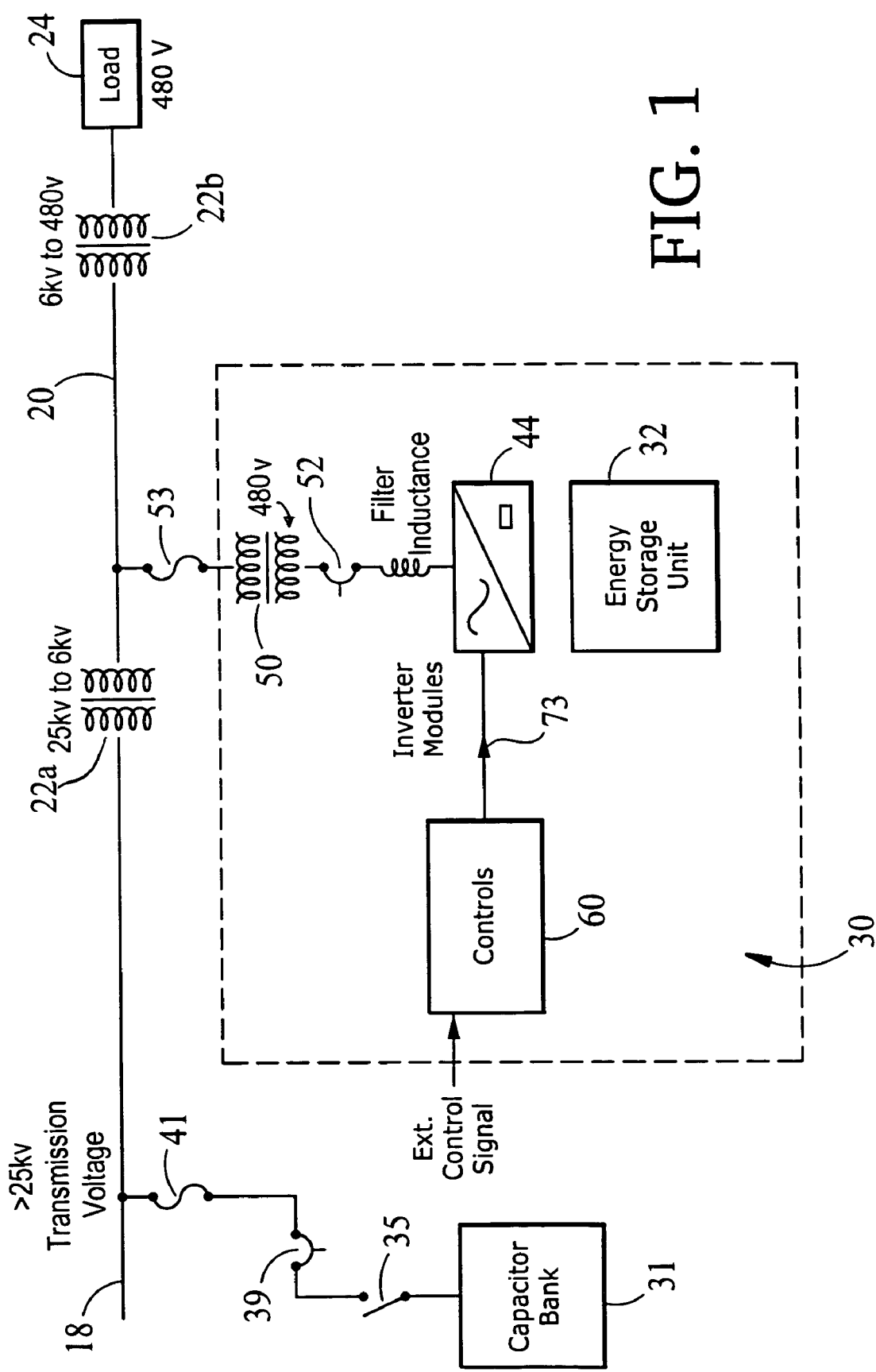
FIG. 1 is a block diagram representation of a voltage recovery device and switched capacitor bank connected to a utility power network.

Referring to FIG. 1, a reactive power compensation system 30 is shown connected in shunt with a distribution line 20 of utility power network. Distribution line 20 is shown connected to a transmission line 18 of the transmission line network through a first transformer 22*a*, which steps down the higher voltage (e.g., greater than 25 kV carried on transmission line 18 to a lower voltage, here 6 kV. A second transformer 22*b* steps down the 6 kV to a voltage suitable for a load 24, here 480 V.

Reactive power compensation system 30 includes an energy storage unit 32, an inverter system 44, and a controller 60, which is used in conjunction with a transmission capacitor bank 31. Energy storage unit 32 may be in a part of a D-SMES module, which is capable, together with inverter system 44, of delivering both real and reactive power, separately or in combination, to distribution line 20. In this embodiment, D-SMES module could be sized at 3.0 MVA and with inverter 44 is capable of delivering an average of 2 MWatts for periods as long as 400 milliseconds, 7.5 MVA for a full second, and 3.0 MVAR of reactive power indefinitely. Further details relating to the operation and construction of the D-SMES module can be found in co-pending application Ser. No. 09/449,435, filed on Nov. 24, 1999, by Paul Frederick Koeppe, Arnold P. Kehrli, John A. Diaz de Leon II, Donald L. Brown, Warren Elliott Buckles and Douglas C. Folts, and entitled "Electric Utility System with Superconducting Magnetic Energy Storage".

As will be described in greater detail below, inverter 44, under the intelligent control of controller 60, serves to transfer reactive power to and from the utility power network. In particular, during the initial period in which capacitor bank 31 begins delivering reactive power to the utility power network, inverter 44 provides an inductive reactance to counteract the abrupt, step-like introduction of capacitive reactive power from capacitor bank 31 on the utility power network. Furthermore, inverter 44 can be controlled to provide additional voltage support to the system prior to capacitive bank 31 being connected to the utility power.

Capacitor bank 31 provides a capacitive reactance (e.g., as much as 36 MVARs) to the system in the event of a contingency (i.e., a nonscheduled event or interruption of service) or sag in the nominal voltage detected on the utility power system. Capacitive banks suitable for use with reactive power compensation system 30 are commercially available from ABB, Zurich Switzerland. Further details relating to capacitor banks used in conjunction with superconducting energy storage systems can be found in U.S. Pat. Nos. 4,962,354, 5,194,803, and 5,376,828, all of which are incorporated herein by reference.

Capacitor bank 31 is coupled to transmission line 18 through a relay switch 35 and a switchgear unit 39, which provide over-current protection and to facilitate maintenance and troubleshooting of capacitor bank 31. A protective fuse 41 is connected between switchgear 39 and transmission line 18.

Figure 2:
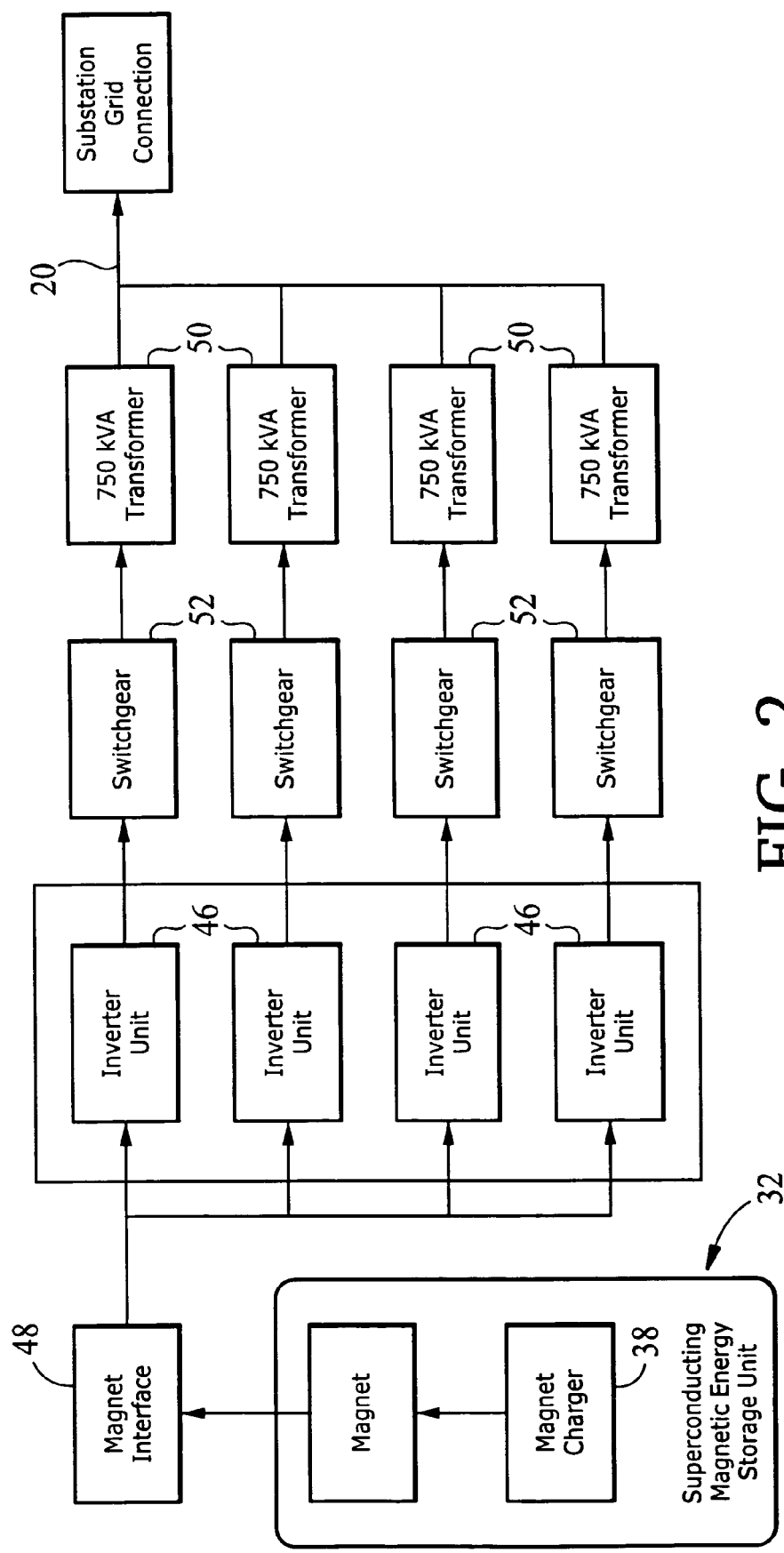
FIG. 2 is a block diagram of a portion of reactive power compensation device of FIG. 1 connected to a distribution line.

Referring to FIG. 2, inverter system 44 converts DC voltage from energy storage unit 32 to AC voltage and, in this embodiment, includes four inverter units 46. In general, inverter 44 can act as a source for leading and lagging reactive power. In general, inverter can only source real power from energy storage unit 32 for as long as real power is available from the energy storage unit. However, inverter 44 can source reactive power indefinitely assuming the inverter is operating at its nominally rated capacity. Thus, inverter 44 can provide reactive power without utilizing power from energy storage unit 32. Further details regarding the arrangement and operation of inverter 44 can be found in co-pending application Ser. No. 09/449,435, filed on Nov. 24, 1999, by Paul Frederick Koeppe, Arnold P. Kehrli, John A. Diaz de Leon II, Donald L. Brown, Warren Elliott Buckles and Douglas C. Folts, and entitled "Electric Utility System with Superconducting Magnetic Energy Storage."

Each inverter unit 46 is capable of providing 750 KVA continuously and 1.875 MVA in overload for one second. The outputs of each inverter unit 46 are combined on the medium-voltage side of the power transformers to yield the system ratings in accordance with the following table.

| Power Flow | Value | Duration |
| --- | --- | --- |
| MVA delivered, leading or lagging | 3.0 | Continuously |
| MVA delivered, leading or lagging, overload condition | 7.5 | 1-2 seconds in event of transmission or distribution fault detection |
| Average MW delivered to utility (for an exemplary D-SMES module). | 2.0 | 0.4 seconds in event of transmission or distribution fault detection |

Each inverter unit 46 includes three inverter modules (not shown). Because inverter units 46 are modular in form, a degree of versatility is provided to accommodate other system ratings with standard, field proven inverter modules. A level of fault tolerance is also possible with this modular approach, although system capability may be reduced. Each inverter module is equipped with a local Slave Controller that manages local functions such as device protection, current regulation, thermal protection, power balance among modules, and diagnostics, among others. Inverter units and modules are mounted in racks with integral power distribution and cooling systems.

Inverter system 44 is coupled to distribution line 20 through step-down transformers 50 and switchgear units 52. Each power transformer 50 is a 6 kV/480 V three-phase oil filled pad mount transformer having a nominal impedance of 5.75% on its own base rating. The power transformers are generally mounted outdoors adjacent to the system enclosure with power cabling protected within an enclosed conduit (not shown). As is shown in FIG. 1, a fuse 53 is connected between step-down transformer 50 and distribution line 20.

Each switchgear unit 52 provides over-current protection between power transformers 50 and inverter units 46. Each of the four main inverter outputs feeds a circuit breaker rated at 480 V, 900 A RMS continuous per phase with 45 kA interruption capacity. Switchgear units 52 also serve as the primary disconnect means for safety and maintenance purposes. The switchgear units are generally mounted adjacent to the inverter unit enclosures.

Referring again to FIG. 1, system control unit 60 has a response time sufficient to ensure that the transfer of power to or from energy storage unit 30 occurs at a speed to address a fault or contingency on the utility system. In general, it is desirable that the fault is detected within 1 line cycle (i.e., 1/60 second for 60 Hz, 1/50 second for 50 Hz). In one embodiment, the response time is less than 500 microseconds.

Figure 3:
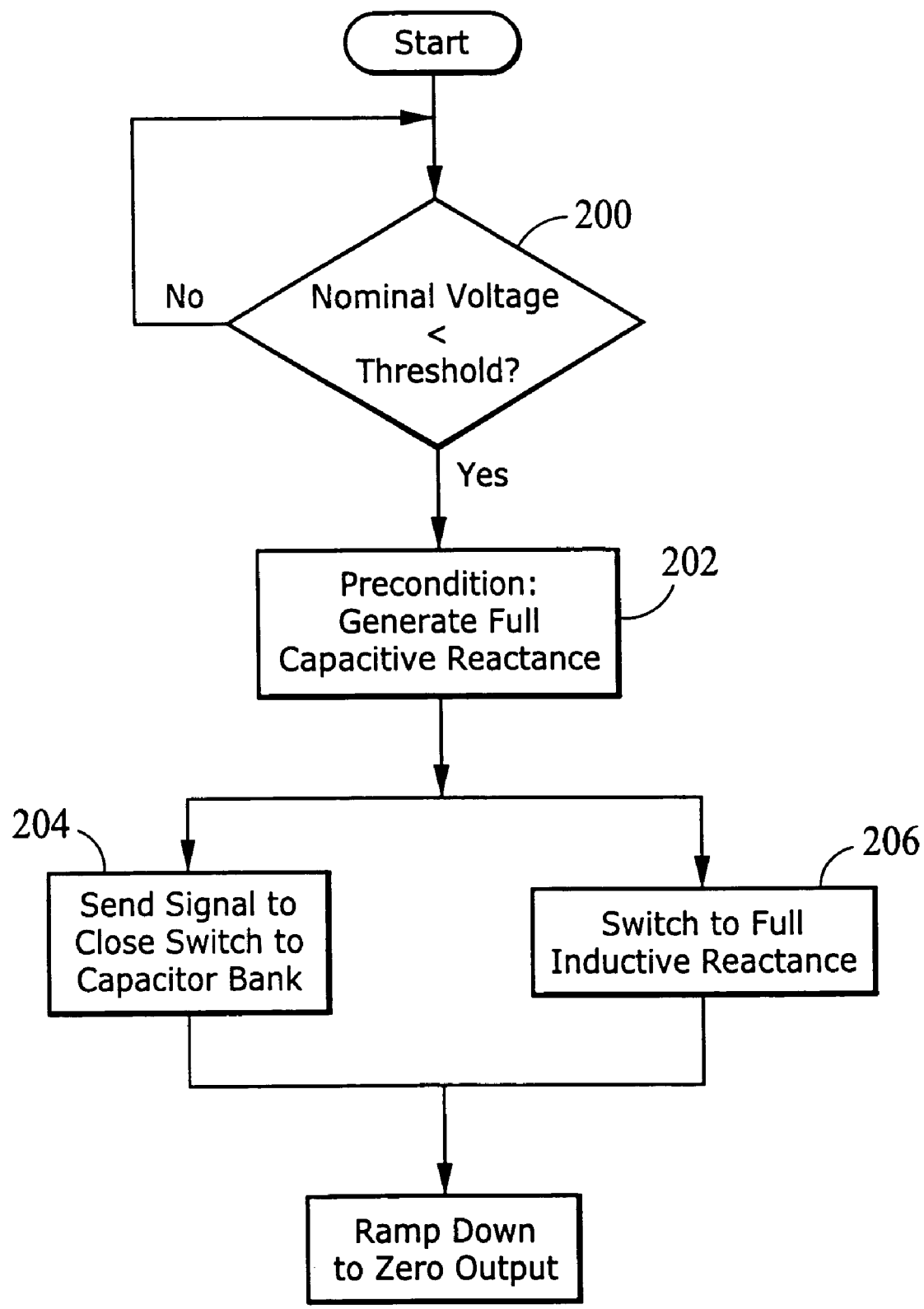
FIG. 3 is a flow diagram illustrating the general steps for operating the voltage recovery device.
Figure 4:
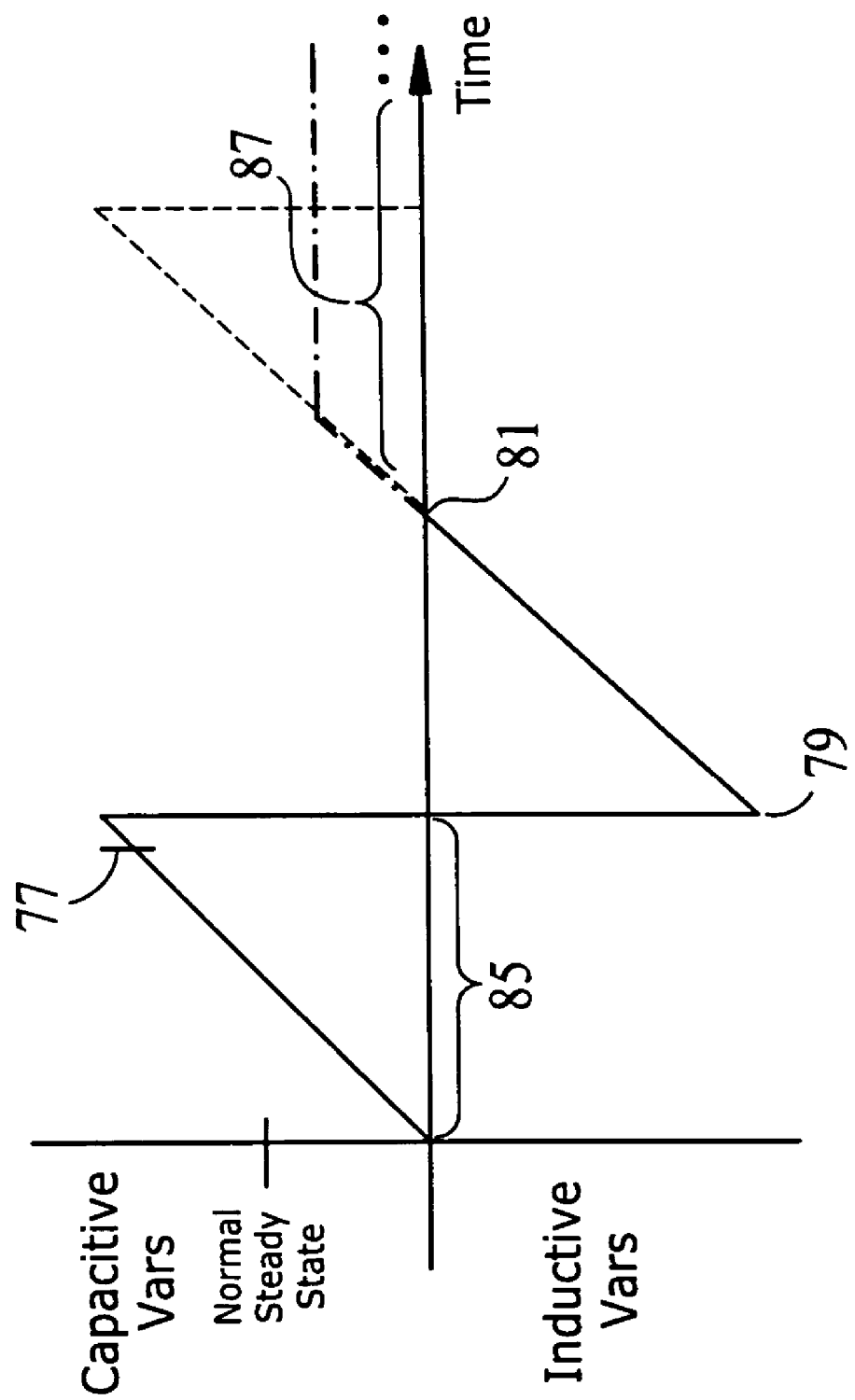
FIG. 4 is a graph showing the output of the reactive compensation device.
Figure 5:
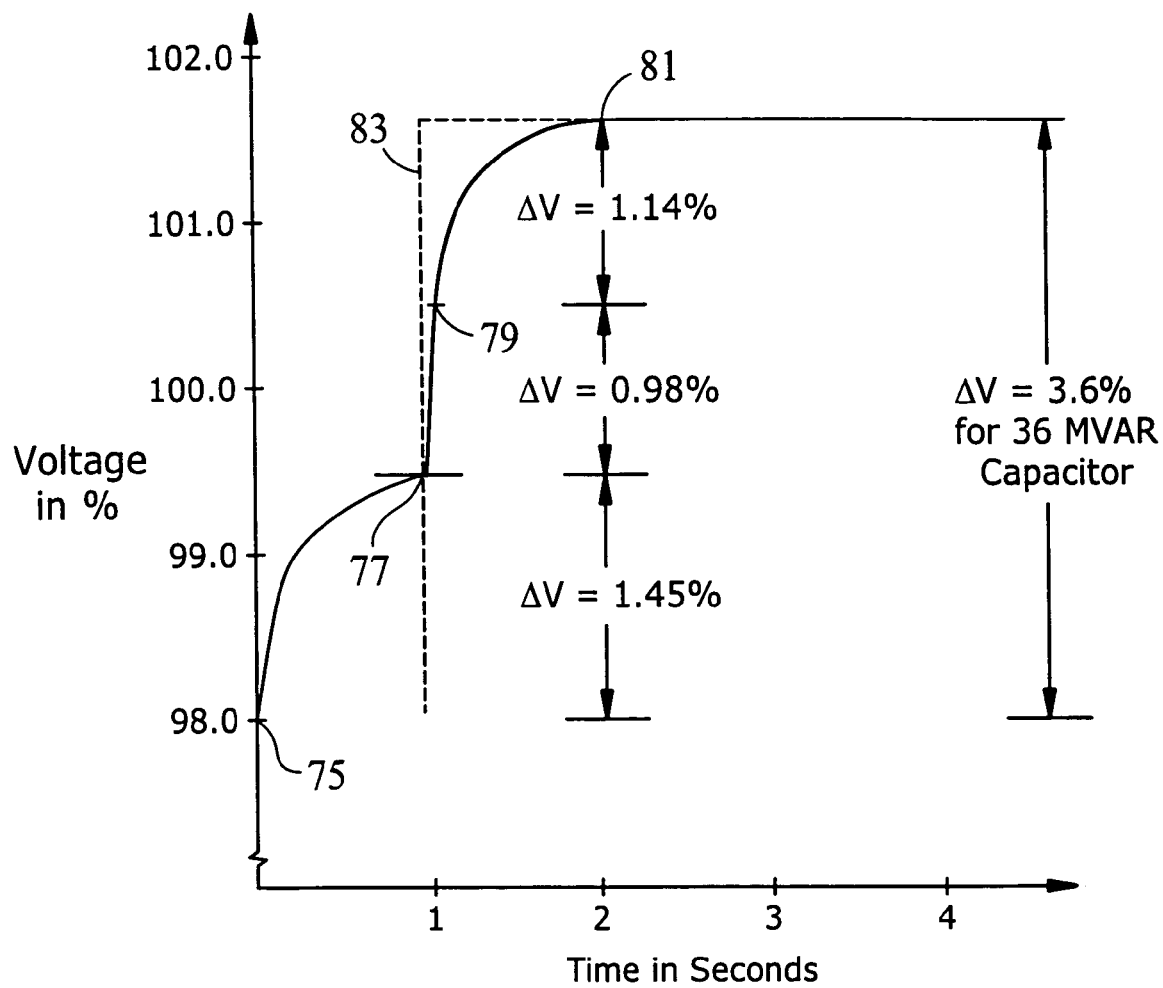
FIG. 5 is a graph showing the utility voltage characteristic as a function of time using the reactive compensation device.

With reference to FIGS. 3-5, the operation of controller 60 and inverter 44 is described in conjunction with an exemplary contingency occurring on the utility power network. At the outset, the nominal voltage of the utility power system is monitored (step 200). For example, the nominal voltage on transmission line 18 is sensed either directly or from a remote device. FIG. 5 shows that in this particular example the voltage is detected as being 98% of nominal value at t=0. When the nominal voltage has dropped below a predetermined threshold value (e.g., here 98%), an input control signal is transmitted to controller 60 which, in turn, transmits a trigger signal 73 (at point 75 of FIG. 5) to activate inverter 44 (step 202) and begin ramping inverter reactive output from zero to full overload rating in 0 to 2 seconds. When full leading output of the inverter has been achieved, a signal is sent to close mechanical contactor 35 (step 204).

Referring to FIG. 4, prior to enabling switch 35 to operate, inverter system 44 is activated to ramp upward to provide the maximum amount of capacitive reactance available, for example, +7.5 MVARs). Because inverter is not intended to provide this maximum reactive power for more than a few seconds, inverter system 44 is operated in an overload mode. Simultaneous with the closing of contactor 35 (at point 77 of FIGS. 4 and 5), inverter 44 is controlled to now provide the maximum available inductive reactance, for example, −7.5 MVARs (step 206). The time period between step 202 and setup 206 is set based on the known characteristics of mechanical contactor 35 or can be learned by controller 60 which monitors the change in voltage. As shown in FIG. 5, inverter 44 alone has increased the voltage by 1.45% prior to energizing capacitor bank 31.

In a second step, when contactor 35 closes, capacitor bank 31 injects capacitive reactance, here 36 MVARs, onto the utility power system. During this period in which capacitive bank 31 is switched into the circuit, the voltage increases an additional 0.98%. The inductive reactance provided by inverter 44 cancels in part the capacitive reactance from capacitor bank 31. This mitigates possible "ringing" caused by the rapid introduction of reactance onto the sagging utility power signal were capacitor bank 31 be allowed to unleash its full 36 MVARs onto the utility power network.

In a third step—immediately after contactor 35 is closed—the inductive reactance provided by inverter 44 ramps down (at point 79) until the inverter no longer generates reactive power (at point 81). During this third step the voltage increases an additional 1.14%. At this point, the sole reactance being introduced to the utility power network is from capacitor bank 31.

As can be seen from FIG. 5, this approach softens the otherwise step-like injection of capacitive reactance from capacitor bank 31 (represented by dashed line 83). Moreover, the full 3.6% voltage increase provided by capacitor bank 31 has been accomplished without an abrupt step-like injection of reactive power. Furthermore, the full 3.6% voltage increase is provided in three steps, none of which exceeds the 2% limit that utilities generally require.

However, in circumstances in which additional capacitive reactance, beyond that provided by capacitive bank 31, would be desirable, inverter 44 can be controlled to provide supplemental capacitive reactance.

Referring to FIG. 4, inverter 44 is controlled to provide additional capacitive reactance in an "emergency overload mode." It is important to note that during this second capacitive reactance period 87, capacitor bank 31 is also providing capacitive reactance to the utility power network. In this overload mode, inverter 44 provides the maximum reactance available. In an alternative application, where capacitive reactance is desired over longer periods (perhaps, indefinitely), inverter 44 may be controlled to provide a lower level (e.g., 2-3 MVARs) in a steady state mode of operation. In applications where real power does not need to be supplied to the utility power network, the invention would be implemented without energy storage unit 32.

Further details relating to the control of inverter 44 to adjust the phase angle of the reactance, can be found in co-pending application Ser. No. 09/449,436, filed on Nov. 23, 1999, by Douglas C. Folts and Warren Elliott Buckles, entitled "Method and Apparatus for Controlling a Phase Angle," and in Ser. No. 60/167,377, filed on Nov. 24, 1999, by Thomas Gregory Hubert, Douglas C. Folts and Warren Elliott Buckles, entitled "Voltage Regulation of Utility Power Network".

It is also important to appreciate that the invention is equally applicable in situations when capacitor bank 31 is removed from the utility power network. That is, a similar step voltage would decrease occur when capacitor bank is switched off. In this case, the process described above in conjunction with FIGS. 3-5 is reversed.

Other embodiments are within the scope of the claims. For example, in the embodiment described above in conjunction with FIGS. 1 and 2, a D-SMES unit was discussed as being used to provide the real and reactive power needed to recover the voltage on the transmission network. However, it is important to appreciate that other voltage recovery devices capable of providing both real and reactive power, including flywheels, batteries, an energy storage capacitive systems bank, compressed gas energy sources, and fuel cell systems (e.g., those that convert carbon based fuels into electricity) are also within the scope of the invention.

Still other embodiments are within the scope of the claims. For example, the invention can also be used in conjunction with other approaches for minimizing transient effects. For example, the invention can complement those approaches using zero-switching techniques, such as that described in U.S. Pat. No. 5,134,356, which is incorporated herein by reference. The utility power network described above in conjunction with FIG. 1 included distribution lines connected to a load 24.

What is claimed is:

1. A method of providing reactive power compensation from a shunt reactive power source adapted to transfer reactive power of a first polarity to a utility power network carrying a nominal voltage, the method comprising:
   providing a reactive power compensation device electrically connected to the utility power network, the device configured to transfer a variable amount of reactive power of a first polarity or a second opposite polarity, the potential range of transferred reactive power consisting of a normal output range and an overload output range;
   detecting a first change of a first predetermined magnitude in the nominal voltage on the utility power network;
   causing, in response to the detecting the first change, the reactive power compensation device to transfer a first amount of reactive power to the utility power network, the amount of reactive power being in the normal output range;
   detecting a second change of a second predetermined magnitude in the nominal voltage on the utility power network;
   causing, in response to the detecting the second change, the reactive power compensation device to transfer a second amount of reactive power to the utility power network; the amount of reactive power being in the overload output range;
   connecting the shunt reactive power source to the utility power network to provide reactive power compensation.

2. The method of claim 1, wherein the second amount of reactive power is transferred for a duration between 0 and 2 seconds.

3. The method of claim 1, wherein the reactive power compensation device is an inverter.

4. The method of claim 3 wherein the utility power network includes a transmission network and a distribution network electrically connected to the transmission network, the distribution network having distribution lines, wherein the shunt reactive power source is connected to the transmission network of the utility power network.

5. The method of claim 3 wherein the reactive power source is a capacitor bank.

6. The method of claim 1 wherein the second predetermined magnitude in the nominal voltage is in a range between 1% and 2% of the desired nominal voltage.

7. The method of claim 1 wherein the reactive power compensation is provide to the utility power network at a location proximal to a connection location of the reactive power source to the utility power network.

8. A system for use with a shunt reactive power source connected through a switch to a utility power network carrying a nominal voltage, the shunt reactive power source adapted to transfer reactive power of a first polarity to the utility power network, the system comprising:
   a reactive power compensation device configured to transfer a variable quantity of reactive power to the utility power network, the reactive power compensation device configured to transfer reactive power of a first polarity or a second opposite polarity,
   a controller which causes the shunt reactive power source to be disconnected from the utility power network, and substantially simultaneously with the electrical disconnection of the shunt reactive power source to the utility power network, causes the output of the reactive power compensation device to change polarity.

9. The system of claim 8 wherein the controller is configured to cause the reactive power compensation device to transfer reactive power compensation of the second polarity to the utility power network prior to disconnecting the shunt reactive power source from the utility power network.

10. The system of claim 8 wherein the reactive power compensation device is configured to transfer the reactive power compensation of the first polarity in a range between 0 and 2 seconds.

11. The system of claim 8 wherein the reactive power source is a capacitor bank and the reactive power compensation of the first polarity is capacitive power compensation.

12. The system of claim 8 wherein the reactive power compensation device is an inverter.

13. The system of claim 8 wherein the utility power network includes a transmission network and a distribution network electrically connected to the transmission network, the distribution network having distribution lines, wherein the shunt reactive power source is connected to the transmission network prior to being disconnected, and the reactive power compensation device is connected to the distribution network of the utility power network.

14. The system of claim 8 wherein the controller is configured to disconnect the shunt reactive power source in response to detecting a change in the nominal voltage in a range between 1% and 2% of a desired nominal voltage.

15. A method of removing a shunt reactive power source of a first polarity from a utility power network carrying a nominal voltage, the method comprising:
   detecting a first change of a first predetermined magnitude in the nominal voltage on the utility power network;
   causing, in response to detecting the first change in the nominal voltage, the reactive power compensation device to transfer reactive power compensation of a second, opposite polarity to the utility power network;

detecting a second change of a second predetermined magnitude in the nominal voltage on the utility power network;

causing, in response to the detecting the second change in the nominal voltage, the shunt reactive power source to be electrically disconnected from the utility power network; and substantially simultaneously with causing the shunt reactive power source to be electrically disconnected from the utility power network, causing the reactive power compensation device to transfer reactive power compensation of the first polarity to the utility power network.

16. The method of claim 15 wherein the reactive power compensation of the second polarity is provided from an inverter.

17. The method of claim 16 wherein the utility power network includes a transmission network and a distribution network electrically connected to the transmission network, the distribution network having distribution lines, wherein the shunt reactive power source is disconnected from the transmission network of the utility power network.

18. The method of claim 15 wherein the second change of a predetermined magnitude of the nominal voltage is in a range between 1% and 2% of the desired nominal voltage.

19. The method of claim 15 wherein the reactive power compensation is provided to the utility power network at a location proximal to a connection location of the reactive power source to the utility power network.

20. The method of claim 15 wherein the reactive power source is a capacitor bank and the reactive power compensation of the first polarity is capacitive power compensation.

21. The method of claim 15 wherein the second polarity is opposite to the first polarity.

22. A system for use with a shunt reactive power source connected through a switch to a utility power network carrying a nominal voltage, the shunt reactive power source adapted to transfer reactive power of a first polarity to the utility power network, the system comprising:

a reactive power compensation device configured to transfer a variable quantity of reactive power to the utility power network, the reactive power compensation device configured to transfer reactive power of a first polarity or a second opposite polarity, a controller which is configured to cause the shunt reactive power source to be connected to the utility power network, and is configured to cause the output of the reactive power compensation device to change polarity substantially simultaneously with the electrical connection of the shunt reactive power source to the utility power network.

23. The system of claim 22 wherein the reactive power source is a capacitor bank and the reactive power compensation of the first polarity is capacitive power compensation.

24. The system of claim 22 wherein the reactive power compensation device is an inverter.

25. The system of claim 22 wherein the utility power network includes a transmission network and a distribution network electrically connected to the transmission network, the distribution network having distribution lines, wherein the shunt reactive power source is connected to the transmission network and the reactive power compensation device is connected to the distribution network of the utility power network.

26. The system of claim 22 wherein the controller is configured to cause the shunt reactive power source to be connected in response to the nominal voltage being in a range between 1% and 2% of a desired nominal voltage.

27. The system of claim 22 wherein the controller is configured to cause the reactive power compensation device to transfer reactive power compensation of the first polarity to the utility power network prior to connecting the shunt reactive power source to the utility power network.

28. The system of claim 22 wherein the reactive power compensation device is configured to transfer the reactive power compensation of the second polarity in a range between 0 and 2 seconds.

29. A method of providing reactive power compensation from a shunt reactive power source to a utility power network carrying a nominal voltage, the method comprising:

detecting a first change of a first predetermined magnitude in the nominal voltage on the utility power network;

causing, in response to detecting the first change in the nominal voltage, the reactive power compensation device to transfer reactive power compensation of a first polarity to the utility power network;

detecting a second change of a second predetermined magnitude in the nominal voltage on the utility power network;

causing, in response to the detecting the second change in the nominal voltage, the shunt reactive power source to be electrically connected to the utility power network to transfer reactive power compensation of a first polarity to the utility power network; and substantially simultaneously with causing the shunt reactive power source to be electrically connected to the utility power network, causing the reactive power compensation device to transfer reactive power compensation of a second, opposite polarity to the utility power network.

30. The method of claim 29 further comprising, after providing reactive power compensation of the second polarity, causing the reactive power compensation device to provide a second stage of reactive power compensation of the first polarity in conjunction with the shunt reactive power source providing reactive power compensation.

31. The method of claim 30 wherein the second stage of reactive power compensation is provided in a steady-state mode.

32. The method of claim 30 wherein the second stage of reactive power compensation is provided in an overload mode.

33. The method of claim 32 wherein providing reactive power compensation of the first polarity is in a duration having a range between 0 and 2 seconds.

34. The method of claim 29 wherein the second change in the predetermined magnitude of the nominal voltage is in a range between 1% and 2% of a desired nominal voltage.

35. The method of claim 29 wherein the reactive power compensation is provided to the utility power network at a location proximal to a connection location of the reactive power source to the utility power network.

36. The method of claim 29 wherein the reactive power source is a capacitor bank and the reactive power compensation of the first polarity is capacitive power compensation.

37. The method of claim 29 wherein the reactive power compensation of the second polarity is provided from an inverter.

38. The method of claim 37 wherein the utility power network includes a transmission network and a distribution network electrically connected to the transmission network, the distribution network having distribution lines, wherein the shunt reactive power source is connected to the transmission network of the utility power network.

39. A system for use with a shunt reactive power source connected through a switch to a utility power network carrying a nominal voltage, the shunt reactive power source adapted to transfer reactive power of a first polarity to the utility power network, the system comprising:
a reactive power compensation device configured to transfer a variable quantity of reactive power of a first polarity or a second opposite polarity to the utility power network;
a controller, which is configured to cause the reactive power compensation device to transfer reactive power to the utility power network in response to the need to increase the reactive power to the utility power network, and is configured to cause the shunt reactive power source to be connected to the utility power network when the output of the reactive power compensation device has reached a pre-determined threshold.

40. The system of claim 39 wherein the reactive power compensation device is an inverter.

41. The system of claim 39 wherein the utility power network includes a transmission network and a distribution network electrically connected to the transmission network, the distribution network having distribution lines, wherein the shunt reactive power source is connected to the transmission network and the reactive power compensation device is connected to the distribution network of the utility power network.

42. The system of claim 39 wherein the controller is configured to respond to the need to increase the reactive power to the utility power network when the nominal voltage of the utility power network is in a range between 1% and 2% of a desired nominal voltage.

43. The system of claim 39 wherein the shunt reactive power source is configured to transfer reactive power of a first polarity to the utility power network, and the reactive power compensation device is configured to transfer a variable quantity of reactive power either a first polarity, or of a second, opposite polarity to the utility power network.

44. The system of claim 39 wherein the controller is configured to cause the reactive power compensation device to stop transferring reactive power compensation to the utility power network substantially simultaneously with causing the shunt reactive power source to be connected to the utility power network.

45. The system of claim 39 wherein the reactive power source is a capacitor bank and the reactive power compensation of the first polarity is capacitive power compensation.

* * * * *